(12) United States Patent
Ogino

(10) Patent No.: US 6,804,383 B2
(45) Date of Patent: Oct. 12, 2004

(54) IMAGE PROCESSING METHOD AND APPARATUS, RECORDING MEDIUM, AND IMAGING APPARATUS

(75) Inventor: Tetsuo Ogino, Tokyo (JP)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 596 days.

(21) Appl. No.: 09/846,631

(22) Filed: May 1, 2001

(65) Prior Publication Data

US 2002/0009216 A1 Jan. 24, 2002

(30) Foreign Application Priority Data

Jun. 19, 2000 (JP) ........................................ 2000-183049

(51) Int. Cl.$^7$ ................................................ G06K 9/00
(52) U.S. Cl. ..................................... 382/128; 600/410
(58) Field of Search ................................. 382/168, 128, 382/129–133; 435/4, 5; 436/172; 600/407, 410, 437; 375/240.16

(56) References Cited

U.S. PATENT DOCUMENTS

| | | | | |
|---|---|---|---|---|
| 4,761,819 A | * | 8/1988 | Denison et al. | 382/261 |
| 5,594,807 A | * | 1/1997 | Liu | 382/128 |
| 5,742,704 A | * | 4/1998 | Suzuki et al. | 382/176 |
| 5,803,082 A | * | 9/1998 | Stapleton et al. | 600/407 |
| 5,876,342 A | * | 3/1999 | Chen et al. | 600/443 |
| 6,309,353 B1 | * | 10/2001 | Cheng et al. | 600/437 |

* cited by examiner

Primary Examiner—Jayanti K. Patel
(74) Attorney, Agent, or Firm—Moonray Kojima

(57) ABSTRACT

For the purpose of providing an image processing method for determining the variance of noise in an image, a residual sum of squares of pixel values is determined for each of a plurality of local regions defined over the entire image (502–508); a histogram thereof is obtained (510); and the variance of noise is determined based on the value of the residual sum of squares that gives a peak of the histogram (512, 514).

22 Claims, 7 Drawing Sheets

IMAGE PROCESSING METHOD AND APPARATUS, RECORDING MEDIUM, AND IMAGING APPARATUS

BACKGROUND OF THE INVENTION

The present invention relates to an image processing method and apparatus, a recording medium and an imaging apparatus, and more particularly to an image processing method and apparatus for determining the variance of noise of an image, a medium for recording a program for a computer to perform such an image processing function, and an imaging apparatus comprising such an image processing apparatus.

In a magnetic resonance imaging (MRI) apparatus, an object to be imaged is carried into an internal space of a magnet system, i.e., a space in which a static magnetic field is generated; a gradient magnetic field and a high frequency magnetic field are applied to generate a magnetic resonance signal inside the object; and a tomographic image is produced (reconstructed) based on the received signal.

In order for an observer to view a fine structure in the tomographic image in more detail, filtering is performed to remove noise in the image. Although the filtering is basically low-pass filtering, since the sharpness of the image is lowered by using the low-pass filtering alone, filtering with an additional process for preserving the sharpness is employed.

Since the filtering in combination with the sharpness preserving process, however, has a side effect that an incidental texture created by noise is enhanced and an anatomically meaningless structure (false structure) is generated, it is necessary to know whether each local portion of the image contains only noise or contains a true structure as well, in order to exclude the portion containing only noise from the sharpness preservation process.

To discriminate noise from a true structure, a method is contemplated involving previously evaluating the variance of noise contained in an image, and identifying a local portion as noise if the variance of pixel values in the local portion and the variance of noise have no significant difference, or otherwise, identifying the local portion as a structure. However, it is impossible to accurately separate only noise from an image containing noise mixed with an image signal, and hence, the variance of noise could not be evaluated.

SUMMARY OF THE INVENTION

Therefore, an object of the present invention is to provide an image processing method and apparatus for determining the variance of image noise, a medium for recording a program for a computer to perform such an image processing function, and an imaging apparatus comprising such an image processing apparatus.

(1) The present invention, in accordance with one aspect thereof for solving the aforementioned problem, is an image processing method characterized in that the method comprises: determining a residual sum of squares of pixel values for each of a plurality of local regions defined over an entire image; obtaining a histogram of said residual sums of squares; and determining a variance of noise based on the residual sum of squares that gives a peak of said histogram.

According to the invention in this aspect, since a residual sum of squares of pixel values is determined for each of a plurality of local regions defined over an entire image, and the variance of noise is determined based on the residual sum of squares that gives a peak of a histogram of the residual sums of squares, the variance of image noise can be accurately determined.

(2) The present invention, in accordance with another aspect thereof for solving the aforementioned problem, is an image processing method characterized in that the method comprises: determining a residual sum of squares of pixel values for each of a plurality of local regions defined over an entire image; obtaining a histogram of said residual sums of squares; fitting said histogram to a function; and determining a variance of noise based on a variable that gives a peak value of said fitted function.

According to the invention in this aspect, since a residual sum of squares of pixel values is determined for each of a plurality of local regions defined over an entire image, a histogram thereof is fitted to a function, and the variance of noise is determined based on a variable that gives a peak value of the function, the variance of image noise can be more accurately determined.

(3) The present invention, in accordance with still another aspect thereof for solving the aforementioned problem, is the image processing method as described regarding (2), characterized in that said function is a Gaussian distribution function.

According to the invention in this aspect, since the histogram is fitted to a Gaussian distribution function, a variable that gives a peak of the function can be accurately determined for image noise in a substantial portion of an image.

(4) The present invention, in accordance with still another aspect thereof for solving the aforementioned problem, is the image processing method as described regarding (2), characterized in that said function is a Rayleigh distribution function.

According to the invention in this aspect, since the histogram is fitted to a Rayleigh distribution function, a variable that gives a peak of the function can be accurately determined for image noise in a background portion of an image.

(5) The present invention, in accordance with still another aspect thereof for solving the aforementioned problem, is the image processing method as described regarding (2), characterized in that said function comprises Gaussian and Rayleigh distribution functions.

According to the invention in this aspect, since the histogram is fitted to a Gaussian distribution function and a Rayleigh distribution function, variables that give peaks of the functions can be accurately determined for image noise in substantial and background portions of an image.

(6) The present invention, in accordance with still another aspect thereof for solving the aforementioned problem, is the image processing method as described regarding any one of (1)–(5), characterized in that the pixel value in said image is the absolute value of a complex number.

According to the invention in this aspect, the variance of noise can be determined for an image with pixel values of the absolute value of a complex number.

(7) The present invention, in accordance with still another aspect thereof for solving the aforementioned problem, is the image processing method as described regarding any one of (1)–(3), characterized in that the pixel value in said image is the real part of a complex number.

According to the invention in this aspect, the variance of noise can be determined for an image with pixel values of the real part of a complex number.

(8) The present invention, in accordance with still another aspect thereof for solving the aforementioned problem, is the image processing method as described regarding any one of (1)–(3), characterized in that the pixel value in said image is the imaginary part of a complex number.

According to the invention in this aspect, the variance of noise can be determined for an image with pixel values of the imaginary part of a complex number.

(9) The present invention, in accordance with still another aspect thereof for solving the aforementioned problem, is the image processing method as described regarding any one of (1)–(8), characterized in that said image is one captured by using magnetic resonance.

According to the invention in this aspect, the variance of noise can be determined for an image captured using magnetic resonance.

(10) The present invention, in accordance with still another aspect thereof for solving the aforementioned problem, is the image processing apparatus characterized in that the apparatus comprises: residual sum of squares calculating means for determining a residual sum of squares of pixel values for each of a plurality of local regions defined over an entire image; histogram calculating means for obtaining a histogram of said residual sums of squares; and noise variance calculating means for determining a variance of noise based on the residual sum of squares that gives a peak of said histogram.

According to the invention in this aspect, since a residual sum of squares of pixel values is determined for each of a plurality of local regions defined over an entire image, and the variance of noise is determined based on the residual sum of squares that gives a peak of a histogram of the residual sums of squares, the variance of image noise can be accurately determined.

(11) The present invention, in accordance with still another aspect thereof for solving the aforementioned problem, is an image processing apparatus characterized in that the apparatus comprises: residual sum of squares calculating means for determining a residual sum of squares of pixel values for each of a plurality of local regions defined over an entire image; histogram calculating means for obtaining a histogram of said residual sums of squares; fitting means for fitting said histogram to a function; and noise variance calculating means for determining a variance of noise based on a variable that gives a peak value of said fitted function.

According to the invention in this aspect, since a residual sum of squares of pixel values is determined for each of a plurality of local regions defined over an entire image, a histogram thereof is fitted to a function, and the variance of noise is determined based on a variable that gives a peak value of the function, the variance of image noise can be more accurately determined.

(12) The present invention, in accordance with still another aspect thereof for solving the aforementioned problem, is the image processing apparatus as described regarding (11), characterized in that said function is a Gaussian distribution function.

According to the invention in this aspect, since the histogram is fitted to a Gaussian distribution function, a variable that gives a peak of the function can be accurately determined for image noise in a substantial portion of an image.

(13) The present invention, in accordance with still another aspect thereof for solving the aforementioned problem, is the image processing apparatus as described regarding (11), characterized in that said function is a Rayleigh distribution function.

According to the invention in this aspect, since the histogram is fitted to a Rayleigh distribution function, a variable that gives a peak of the function can be accurately determined for image noise in a background portion of an image.

(14) The present invention, in accordance with still another aspect thereof for solving the aforementioned problem, is the image processing apparatus as described regarding (11), characterized in that said function comprises Gaussian and Rayleigh distribution functions.

According to the invention in this aspect, since the histogram is fitted to a Gaussian distribution function and a Rayleigh distribution function, variables that give peaks of the functions can be accurately determined for image noise in substantial and background portions of an image.

(15) The present invention, in accordance with still another aspect thereof for solving the aforementioned problem, is the image processing apparatus as described regarding any one of (10)–(14), characterized in that the pixel value in said image is the absolute value of a complex number.

According to the invention in this aspect, the variance of noise can be determined for an image with pixel values of the absolute value of a complex number.

(16) The present invention, in accordance with still another aspect thereof for solving the aforementioned problem, is the image processing apparatus as described regarding any one of (10)–(12), characterized in that the pixel value in said image is the real part of a complex number.

According to the invention in this aspect, the variance of noise can be determined for an image with pixel values of the real part of a complex number.

(17) The present invention, in accordance with still another aspect thereof for solving the aforementioned problem, is the image processing apparatus as described regarding any one of (10)–(12), characterized in that the pixel value in said image is the imaginary part of a complex number.

According to the invention in this aspect, the variance of noise can be determined for an image with pixel values of the imaginary part of a complex number.

(18) The present invention, in accordance with still another aspect thereof for solving the aforementioned problem, is the image processing apparatus as described regarding any one of (10)–(17), characterized in that said image is one captured by using magnetic resonance.

According to the invention in this aspect, the variance of noise can be determined for an image captured using magnetic resonance.

(19) The present invention, in accordance with still another aspect thereof for solving the aforementioned problem, is a recording medium characterized in that the medium records in a computer-readable manner a program for a computer to perform: a residual sum of squares calculating function for determining a residual sum of squares of pixel values for each of a plurality of local regions defined over an entire image; a histogram calculating function for obtaining a histogram of said residual sums of squares; and a noise variance calculating function for determining a variance of noise based on the residual sum of squares that gives a peak of said histogram.

According to the invention in this aspect, since a program recorded on the recording medium makes a computer perform the functions of determining a residual sum of squares of pixel values for each of a plurality of local regions defined over an entire image, and determining the variance of noise based on the residual sum of squares that gives a peak of a histogram of the residual sums of squares, the variance of image noise can be accurately determined.

(20) The present invention, in accordance with still another aspect thereof for solving the aforementioned problem, is a recording medium characterized in that the medium records in a computer-readable manner a program for a computer to perform: a residual sum of squares calculating function for determining a residual sum of squares of pixel values for each of a plurality of local regions defined over an entire image; a histogram calculating function for obtaining a histogram of said residual sums of squares; a fitting function for fitting said histogram to a function; and a noise variance calculating function for determining a variance of noise based on a variable that gives a peak value of said fitted function.

According to the invention in this aspect, since a program recorded on the recording medium makes a computer perform the functions of determining a residual sum of squares of pixel values for each of a plurality of local regions defined over an entire image, and fitting a histogram thereof to a function, and determining the variance of noise based on a variable that gives a peak value of the function, the variance of image noise can be more accurately determined.

(21) The present invention, in accordance with still another aspect thereof for solving the aforementioned problem, is the recording medium as described regarding (20), characterized in that said function is a Gaussian distribution function.

According to the invention in this aspect, since a program recorded on the recording medium makes a computer perform the function of fitting the histogram to a Gaussian distribution function, a variable that gives a peak of the function can be accurately determined for image noise in a substantial portion of an image.

(22) The present invention, in accordance with still another aspect thereof for solving the aforementioned problem, is the recording medium as described regarding (20), characterized in that said function is a Rayleigh distribution function.

According to the invention in this aspect, since a program recorded on the recording medium makes a computer perform the function of fitting the histogram to a Rayleigh distribution function, a variable that gives a peak of the function can be accurately determined for image noise in a background portion of an image.

(23) The present invention, in accordance with still another aspect thereof for solving the aforementioned problem, is the recording medium as described regarding (20), characterized in that said function comprises Gaussian and Rayleigh distribution functions.

According to the invention in this aspect, since a program recorded on the recording medium makes a computer perform the function of fitting the histogram to a Gaussian distribution function and a Rayleigh distribution function, variables that give peaks of the functions can be accurately determined for image noise in substantial and background portions of an image.

(24) The present invention, in accordance with still another aspect thereof for solving the aforementioned problem, is the recording medium as described regarding any one of (19)–(23), characterized in that the pixel value in said image is the absolute value of a complex number.

According to the invention in this aspect, a program recorded on the recording medium can make a computer perform the function of determining the variance of noise for an image with pixel values of the absolute value of a complex number.

(25) The present invention, in accordance with still another aspect thereof for solving the aforementioned problem, is the recording medium as described regarding any one of (19)–(21), characterized in that the pixel value in said image is the real part of a complex number.

According to the invention in this aspect, a program recorded on the recording medium can make a computer perform the function of determining the variance of noise for an image with pixel values of the real part of a complex number.

(26) The present invention, in accordance with still another aspect thereof for solving the aforementioned problem, is the recording medium as described regarding any one of (19)–(21), characterized in that the pixel value in said image is the imaginary part of a complex number.

According to the invention in this aspect, a program recorded on the recording medium can make a computer perform the function of determining the variance of noise for an image with pixel values of the imaginary part of a complex number.

(27) The present invention, in accordance with still another aspect thereof for solving the aforementioned problem, is the recording medium as described regarding any one of (19)–(26), characterized in that said image is one captured by using magnetic resonance.

According to the invention in this aspect, a program recorded on the recording medium can make a computer perform the function of determining the variance of noise for an image captured using magnetic resonance.

(28) The present invention, in accordance with still another aspect thereof for solving the aforementioned problem, is an imaging apparatus for producing an image based on a signal collected from an object, characterized in that the apparatus comprises: residual sum of squares calculating means for determining a residual sum of squares of pixel values for each of a plurality of local regions defined over an entire image; histogram calculating means for obtaining a histogram of said residual sums of squares; and noise variance calculating means for determining a variance of noise based on the residual sum of squares that gives a peak of said histogram.

According to the invention in this aspect, since a residual sum of squares of pixel values is determined for each of a plurality of local regions defined over an entire image, and the variance of noise is determined based on the residual sum of squares that gives a peak of a histogram of the residual sums of squares, the variance of image noise can be accurately determined.

(29) The present invention, in accordance with still another aspect thereof for solving the aforementioned problem, is an imaging apparatus for producing an image based on a signal collected from an object, characterized in that the apparatus comprises: residual sum of squares calculating means for determining a residual sum of squares of pixel values for each of a plurality of local regions defined over an entire image; histogram calculating means for obtaining a histogram of said residual sums of squares; fitting means for fitting said histogram to a function; and noise variance calculating means for determining a variance of noise based on a variable that gives a peak value of said fitted function.

According to the invention in this aspect, since a residual sum of squares of pixel values is determined for each of a plurality of local regions defined over an entire image, a histogram thereof is fitted to a function, and the variance of noise is determined based on a variable that gives a peak value of the function, the variance of image noise can be more accurately determined.

(30) The present invention, in accordance with still another aspect thereof for solving the aforementioned problem, is the imaging apparatus as described regarding (29), characterized in that said function is a Gaussian distribution function.

According to the invention in this aspect, since the histogram is fitted to a Gaussian distribution function, a variable that gives a peak of the function can be accurately determined for image noise in a substantial portion of an image.

(31) The present invention, in accordance with still another aspect thereof for solving the aforementioned problem, is the imaging apparatus as described regarding (29), characterized in that said function is a Rayleigh distribution function.

According to the invention in this aspect, since the histogram is fitted to a Rayleigh distribution function, a variable that gives a peak of the function can be accurately determined for image noise in a background portion of an image.

(32) The present invention, in accordance with still another aspect thereof for solving the aforementioned problem, is the imaging apparatus as described regarding (29), characterized in that said function comprises Gaussian and Rayleigh distribution functions.

According to the invention in this aspect, since the histogram is fitted to a Gaussian distribution function and a Rayleigh distribution function, variables that give peaks of the functions can be accurately determined for image noise in substantial and background portions of an image.

(33) The present invention, in accordance with still another aspect thereof for solving the aforementioned problem, is the imaging apparatus as described regarding any one of (28)–(32), characterized in that the pixel value in said image is the absolute value of a complex number.

According to the invention in this aspect, the variance of noise can be determined for an image with pixel values of the absolute value of a complex number.

(34) The present invention, in accordance with still another aspect thereof for solving the aforementioned problem, is the imaging apparatus as described regarding any one of (28)–(30), characterized in that the pixel value in said image is the real part of a complex number.

According to the invention in this aspect, the variance of noise can be determined for an image with pixel values of the real part of a complex number.

(35) The present invention, in accordance with still another aspect thereof for solving the aforementioned problem, is the imaging apparatus as described regarding any one of (28)–(30), characterized in that the pixel value in said image is the imaginary part of a complex number.

According to the invention in this aspect, the variance of noise can be determined for an image with pixel values of the imaginary part of a complex number.

(36) The present invention, in accordance with still another aspect thereof for solving the aforementioned problem, is the image processing apparatus as described regarding any one of (28)–(35), characterized in that said signal is a magnetic resonance signal.

According to the invention in this aspect, the variance of noise can be determined for an image captured using magnetic resonance.

Therefore, the present invention can provide an image processing method and apparatus for determining the variance of noise of an image, a medium for recording a program for a computer to perform such an image processing function, and an imaging apparatus comprising such an image processing apparatus.

Further objects and advantages of the present invention will be apparent from the following description of the preferred embodiments of the invention as illustrated in the accompanying drawings.

DETAILED DESCRIPTION OF THE INVENTION

Figure 1:
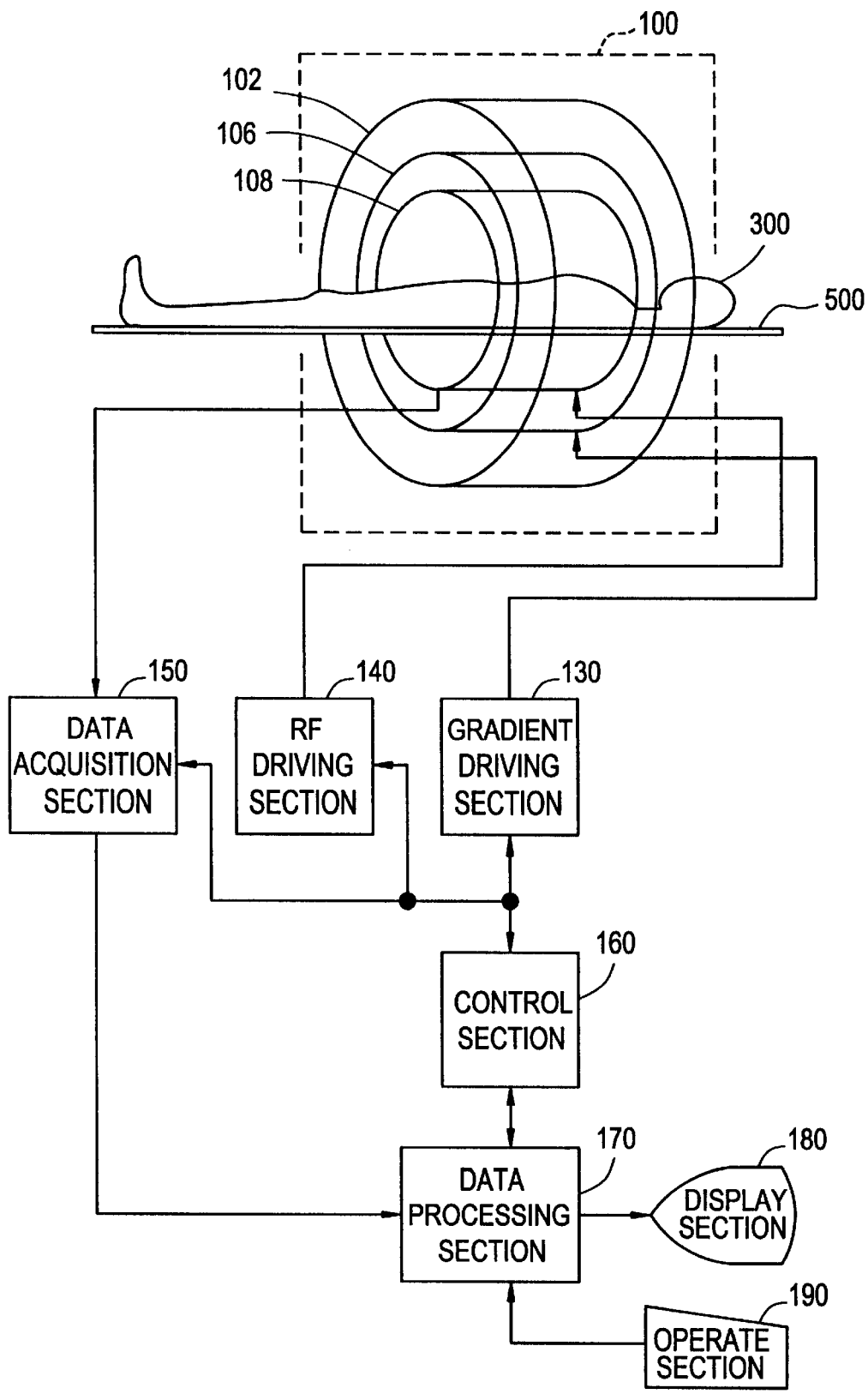
FIG. 1 is a block diagram of an apparatus in accordance with an embodiment of the present invention.

Several embodiments of the present invention will now be described in detail with reference to the accompanying drawings. It should be noted that the present invention is not limited to the embodiments. FIG. 1 shows a block diagram of an imaging apparatus, which is an embodiment of the present invention. The configuration of the apparatus represents an embodiment of the apparatus in accordance with the present invention. The operation of the apparatus represents an embodiment of the method in accordance with the present invention.

As shown in FIG. 1, the present apparatus has a magnet system 100. The magnet system 100 has a main magnetic field coil section 102, a gradient coil section 106 and an RF (radio frequency) coil section 108. These coil sections have a generally cylindrical shape and are concentrically disposed. An object to be imaged 300 is rested on a cradle 500 and carried into and out of the generally cylindrical internal space (bore) of the magnet system 100 by carrier means, which is not shown.

The main magnetic field coil section 102 generates a static magnetic field in the internal space of the magnet system 100. The direction of the static magnetic field is generally in parallel with the direction of the body axis of the object 300. That is, a "horizontal" magnetic field is generated. The main magnetic field coil section 102 is made using a superconductive coil, for example. It will be easily recognized that the main magnetic field coil section 102 is not limited to the superconductive coil, but may be made using a normal conductive coil or the like.

The gradient coil section 106 generates gradient magnetic fields for imparting gradients to the static magnetic field strength. The gradient magnetic fields to be generated are the following three: a slice gradient magnetic field, a readout gradient magnetic field and a phase encoding gradient magnetic field. The gradient coil section 106 has three gradient coils, which are not shown, corresponding to these three gradient magnetic fields.

The RF coil section 108 generates a high frequency magnetic field for exciting spins within the object 300 in the static magnetic field space. The generation of the high frequency magnetic field will be referred to as transmission of an RF excitation signal hereinafter. The RF coil section 108 also receives electromagnetic wave, i.e., a magnetic resonance signal, generated by the excited spins.

The RF coil section 108 has transmission and receive coils, which are not shown. For the transmission and receive coils, the same coil or separate dedicated coils may be used.

The gradient coil section 106 is connected with a gradient driving section 130. The gradient driving section 130 supplies driving signals to the gradient coil section 106 to generate the gradient magnetic fields. The gradient driving section 130 has three driving circuits, which are not shown, corresponding to the three gradient coils in the gradient coil section 106.

The RF coil section 108 is connected with an RF driving section 140. The RF driving section 140 supplies driving signals to the RF coil section 108 to transmit the RF excitation signal, thereby exciting the spins within the object 300.

The RF coil section 108 is connected with a data acquisition section 150. The data acquisition section 150 gathers receive signals received by the RF coil section 108 and acquires the signals as view data.

The gradient driving section 130, RF driving section 140 and data acquisition section 150 are connected with a control section 160. The control section 160 controls the gradient driving section 130—the data acquisition section 150 to perform imaging.

The output of the data acquisition section 150 is connected to a data processing section 170. The data processing section 170 is made using, for example, a computer. The data processing section 170 has a memory, which is not shown. The memory stores programs for the data processing section 170 and several kinds of data. The function of the present apparatus is achieved by the data processing section 170 executing the program stored in the memory.

The data processing section 170 stores data gathered from the data acquisition section 150 into the memory. A data space is formed in the memory. The data space constitutes a two-dimensional Fourier space. The two-dimensional Fourier space is sometimes referred to as a k-space. The data processing section 170 performs a two-dimensional inverse Fourier transformation on the data in the two-dimensional Fourier space to produce (reconstruct) an image of the object 300.

The image reconstructed by the two-dimensional inverse Fourier transformation has pixel values of a complex number. The absolute value of the complex number is used to construct an absolute-value image. The real part of the complex number can be used to construct a real-part image. The imaginary part of the complex number can be used to construct an imaginary-part image. The real part and the imaginary part can be positive and negative values. Such image is sometimes referred to as a positive-negative image.

The data processing section 170 has a function of performing image processing for determining the variance of noise of the reconstructed image. The image processing function of the data processing section 170 will be described later in more detail.

The data processing section 170 is an embodiment of the image processing apparatus of the present invention. The configuration of the apparatus represents an embodiment of the apparatus in accordance with the present invention. The operation of the apparatus represents an embodiment of the method in accordance with the present invention.

The data processing section 170 is connected to the control section 160. The data processing section 170 is above the control section 160 and controls it. The data processing section 170 is connected with a display section 180 and an operating section 190. The display section 180 comprises a graphic display, etc. The operating section 190 comprises a keyboard, etc., provided with a pointing device.

The display section 180 displays the reconstructed image and several kinds of information output from the data processing section 170. The operating section 190 is operated by a human operator, and the section 190 inputs several commands, information and so forth to the data processing section 170. The operator interactively operates the present apparatus via the display section 180 and operating section 190.

Figure 2:
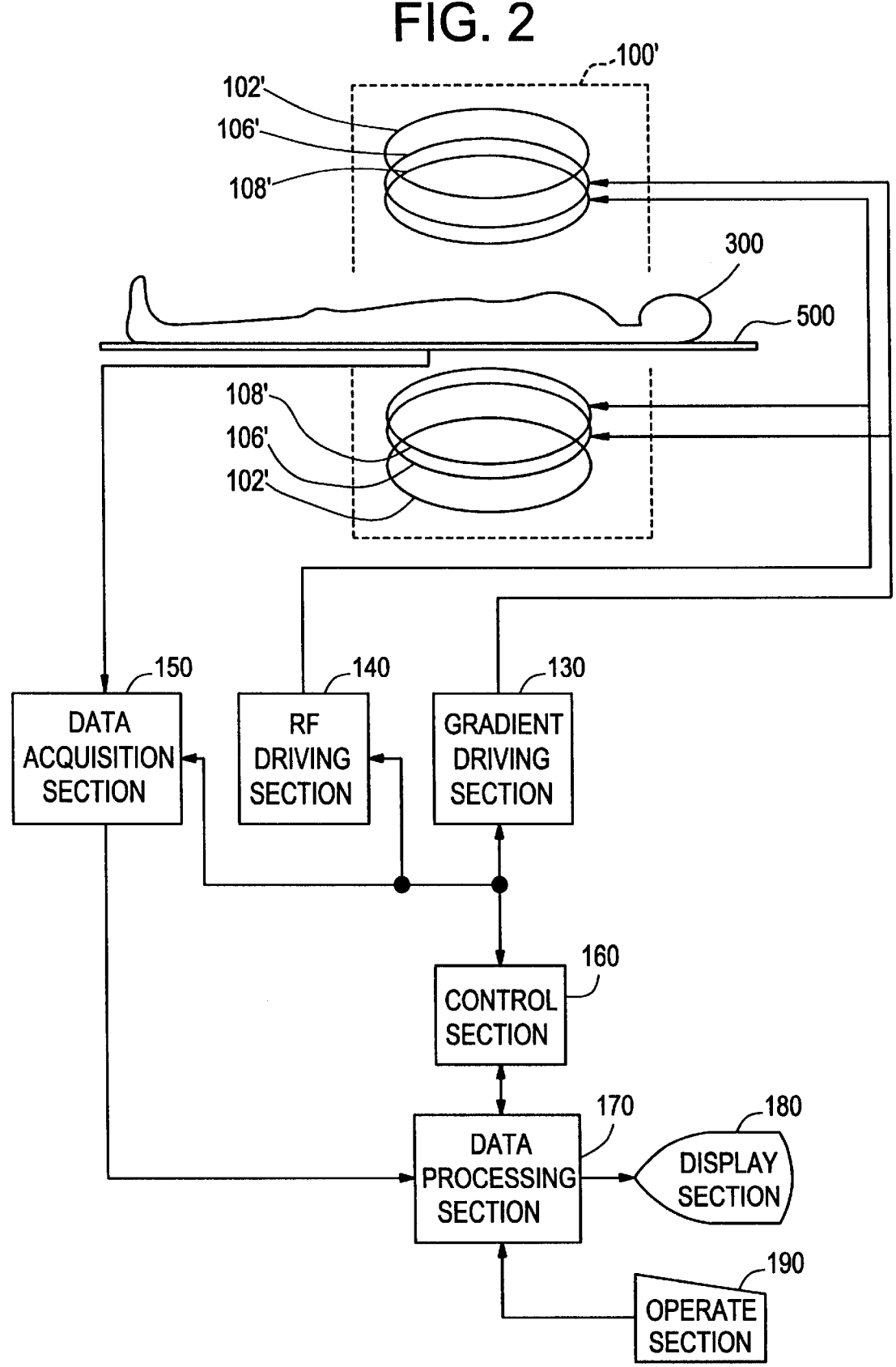
FIG. 2 is a block diagram of an apparatus in accordance with an embodiment of the present invention.

FIG. 2 illustrates a block diagram of an imaging apparatus of another type, which is another embodiment of the present invention. The configuration of the apparatus represents an embodiment of the apparatus in accordance with the present invention.

The apparatus shown in FIG. 2 has a magnet system 100' of a type different from that in the apparatus shown in FIG. 1. Since the apparatus has the configuration similar to that of the apparatus shown in FIG. 1 except the magnet system 100', similar portions are designated by similar reference numerals and the explanation thereof will be omitted.

The magnet system 100' has a main magnetic field magnet section 102', a gradient coil section 106' and an RF coil section 108'. The main magnetic field magnet section 102' and the coil sections each comprises a pair of members facing each other across a space. These sections have a generally disk-like shape and are disposed to have a common center axis. The object 300 is rested on the cradle 500 and carried into and out of the internal space (bore) of the magnet system 100' by carrier means, which is not shown.

The main magnetic field magnet section 102' generates a static magnetic field in the internal space of the magnet system 100'. The direction of the static magnetic field is generally orthogonal to the direction of the body axis of the object 300. That is, a "vertical" magnetic field is generated. The main magnetic field magnet section 102' is made using a permanent magnet, for example. It will be easily recognized that the main magnetic field magnet section 102' is not limited to the permanent magnet, but may be made using a super or normal conductive electromagnet or the like.

The gradient coil section 106' generates gradient magnetic fields for imparting gradients to the static magnetic field strength. The gradient magnetic fields to be generated are the following three: a slice gradient magnetic field, a readout gradient magnetic field and a phase encoding gradient magnetic field. The gradient coil section 106' has three gradient coils, which are not shown, corresponding to these three gradient magnetic fields.

The RF coil section 108' transmits an RF excitation signal for exciting spins within the object 300 in the static magnetic field space. The RF coil section 108' also receives a magnetic resonance signal generated by the excited spins. The RF coil section 108' has transmission and receive coils, which are not shown. For the transmission and receive coils, the same coil or separate dedicated coils may be used.

Figure 3:
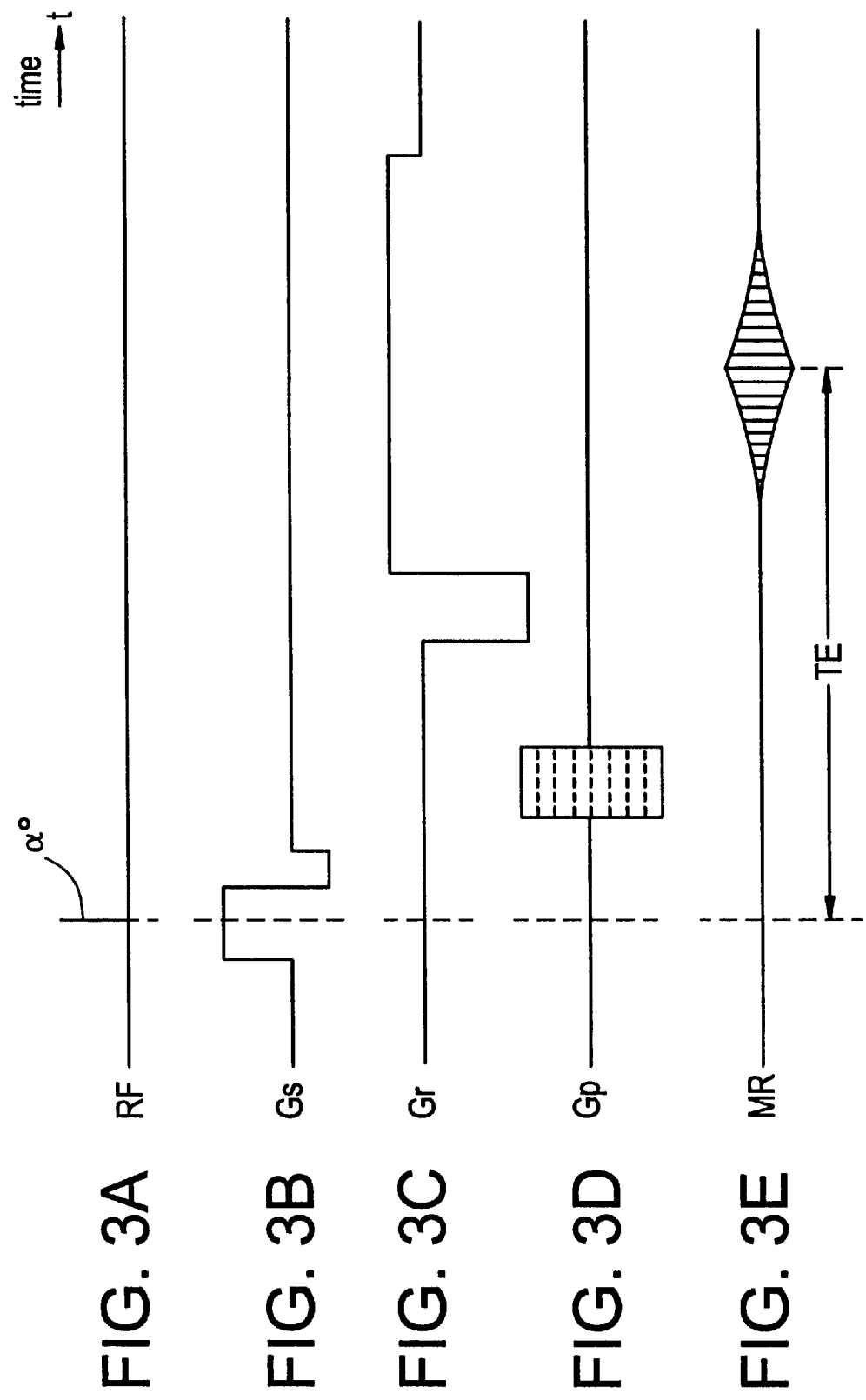
FIG. 3 is a diagram illustrating an exemplary pulse sequence executed by the apparatus shown in FIG. 1 or 2.

FIG. 3 shows an exemplary pulse sequence for use in magnetic resonance imaging. The pulse sequence is one in accordance with a gradient echo (GRE) technique.

Specifically, (1) is a sequence of an $\alpha°$ pulse for RF excitation of the GRE technique, and (2), (3), (4) and (5) are sequences of a slice gradient Gs, a readout gradient Gr, a phase encoding gradient Gp and a gradient echo MR, respectively, of the GRE technique. It should be noted that the $\alpha°$ pulse is represented by its central signal. The pulse sequence proceeds from the left to the right along a time axis t.

As shown, the $\alpha°$ pulse achieves $\alpha°$ excitation of the spins, wherein the flip angle $\alpha°$ is not greater than 90°. At the same time, the slice gradient Gs is applied to achieve selective excitation for a certain slice.

After the $\alpha°$ excitation, the spins are phase-encoded by the phase encoding gradient Gp. Next, the spins are first dephased and are subsequently rephased by the readout gradient Gr to generate a gradient echo MR. The gradient echo MR has its maximum signal intensity at an echo time TE after the $\alpha°$ excitation. The gradient echo MR is collected by the data acquisition section 150 as view data.

Such a pulse sequence is repeated 64–512 times in a cycle of TR (repetition time). The phase encoding gradient Gp is varied for each repetition to provide a different phase encoding each time. Thus, view data for 64–512 views filling the k-space are obtained.

Figure 4:
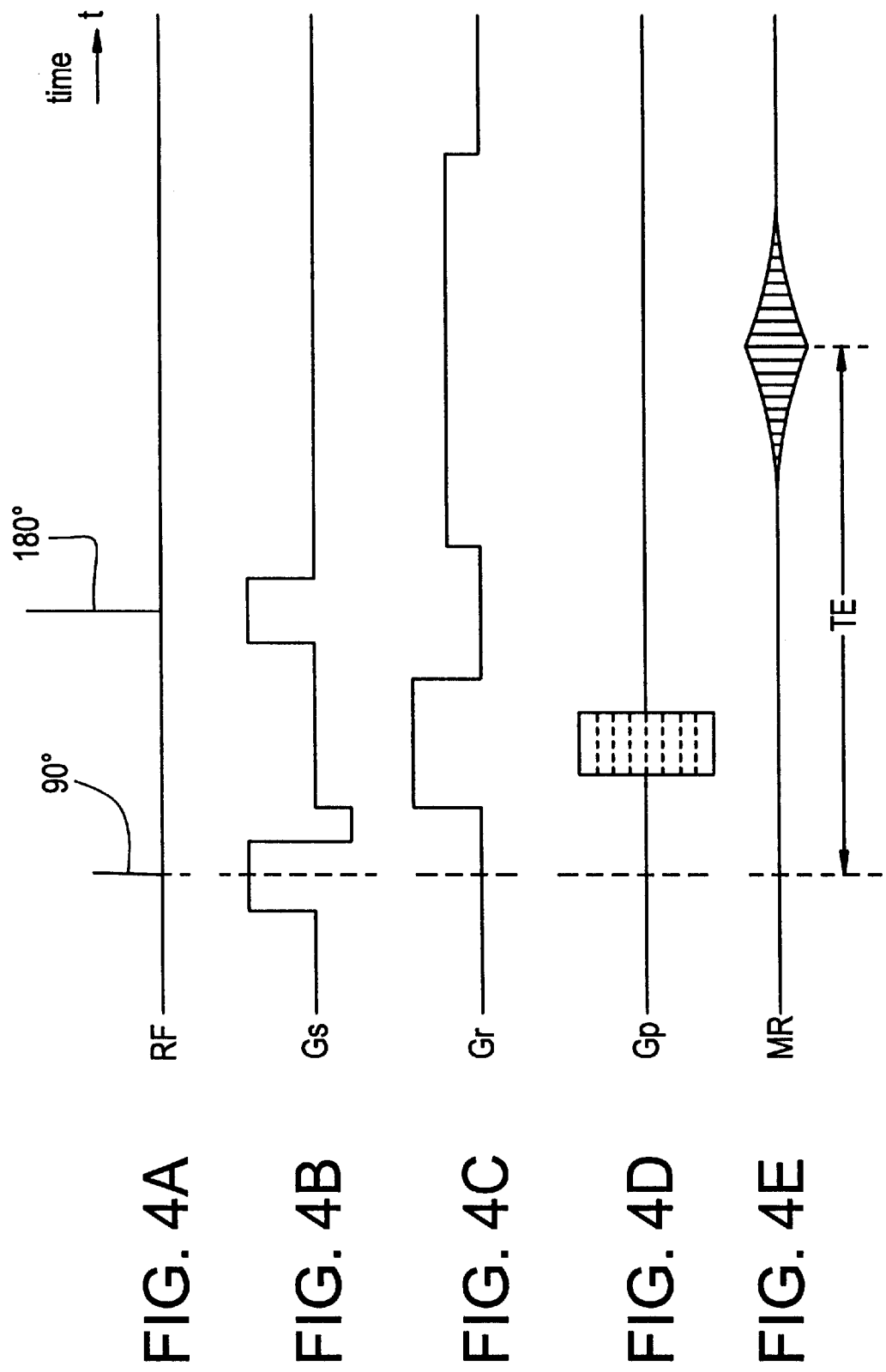
FIG. 4 is a diagram illustrating an exemplary pulse sequence executed by the apparatus shown in FIG. 1 or 2.

Another example of the magnetic resonance imaging pulse sequence is illustrated in FIG. 4. The pulse sequence is one in accordance with a spin echo (SE) technique.

Specifically, (1) is a sequence of 90° and 180° pulses for RF excitation of the SE technique, and (2), (3), (4) and (5) are sequences of a slice gradient Gs, a readout gradient Gr, a phase encoding gradient Gp and a spin echo MR, respectively, of the SE technique. It should be noted that the 90° and 180° pulses are represented by their respective central signals. The pulse sequence proceeds from the left to the right along a time axis t.

As shown, the 90° pulse achieves 90° excitation of the spins. At the same time, the slice gradient Gs is applied to achieve selective excitation for a certain slice. After a predetermined time from the 90° excitation, 180° excitation by the 180° pulse, or spin inversion, is performed. Again, the slice gradient Gs is applied at the same time to achieve selective inversion for the same slice.

During the period between the 90° excitation and the spin inversion, the readout gradient Gr and phase encoding gradient Gp are applied. The readout gradient Gr dephases the spins. The phase encoding gradient Gp phase-encodes the spins.

After the spin inversion, the spins are rephased by the readout gradient Gr to generate a spin echo MR. The spin echo MR has its maximum signal intensity at TE after the 90° excitation. The spin echo MR is collected by the data acquisition section 150 as view data. Such a pulse sequence is repeated 64–512 times in a cycle of TR. The phase encoding gradient Gp is varied for each repetition to provide a different phase encoding each time. Thus, view data for 64–512 views filling the k-space are obtained.

It should be noted that the pulse sequence employed in the imaging is not limited to that of the GRE or SE technique, but may be of any other appropriate technique, such as FSE (fast spin echo), fast recovery FSE and echo planar imaging (EPI) techniques.

The data processing section 170 performs a two-dimensional inverse Fourier transformation on the view data in the k-space to reconstruct a tomographic image of the object 300. The reconstructed image is stored in the memory, and displayed by the display section 180.

An image captured by the magnetic resonance imaging has a character that it often has a uniform structure in a local portion. When noise exists in the local region having a uniform structure, the distribution of pixel values is a Gaussian distribution centering the average value of the pixel values in the region, and their standard deviation C represents the variance of noise. Such a property is used to determine the variance of noise in an image in accordance with the following image processing.

Figure 5:
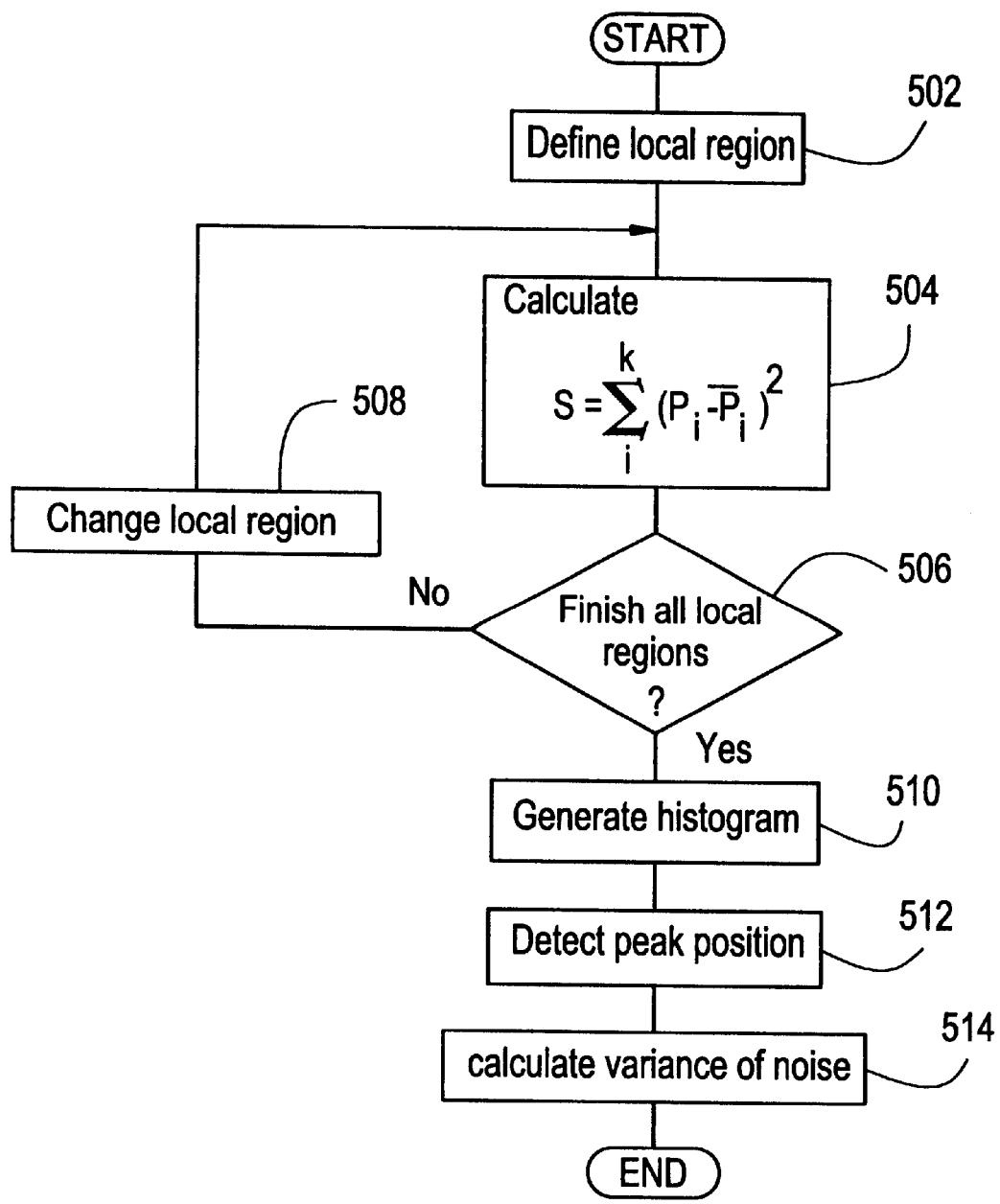
FIG. 5 is a flow chart of image processing performed by the apparatus shown in FIG. 1 or 2.

FIG. 5 shows a flow chart of an image processing operation by the data processing section 170. As shown, at Step 502, a local region is defined in an image. The local region is a region to which the pixel values used in the calculation in the next step belong. For example, a local region in the center of the image is selected as the first region.

A pixel matrix of N×N is employed as the local region. N is, for example, 9. It should be noted that the matrix size is not limited thereto but may be any appropriate one. Moreover, the pixel matrix is not limited to the N×N matrix but may be any appropriate region centering a pixel. The local region will sometimes be referred to simply as a region hereinbelow.

Next, at Step 504, a residual sum of squares S of pixel values in the region is determined. Specifically, $$S = \sum_{i}^{k} (P_i - \overline{P_i})^2, \quad (1)$$

wherein:
P$_i$ is a pixel value, and $\overline{P_i}$ is an average value of the pixel values in the N×N region centering P$_i$. Moreover, k is, for example, 81.

Next, at Step 506, a decision is made whether the above processes are finished for all the local regions, and if not, the local region is changed at Step 508. Thus, an adjacent N×N region, for example, is selected as a new local region.

The process of Step 504 is performed on the new local region to determine the residual sum of squares of pixel values. Thereafter, the residual sum of squares of pixel values is determined for every local region in the image in a similar manner.

The data processing section 170 for performing the processes of Steps 502–508 is an embodiment of the residual sum of squares calculating means of the present invention. The processes of Steps 502–508 constitute an embodiment of the residual sum of squares calculating function of the present invention.

The residual sums of squares thus obtained have a $\chi^2$ distribution, and the average value thereof is $k \cdot \sigma^2$.

When k is large, the $\chi^2$ distribution approximates to a Gaussian distribution, and the peak position lies approximately at $k \cdot \sigma^2$.

Next, at Step 510, a histogram of the residual sums of squares S is generated. The data processing section 170 for performing the process of Step 510 is an embodiment of the histogram calculating means of the present invention. The process of Step 510 is an embodiment of the histogram calculating function of the present invention.

Figure 6:
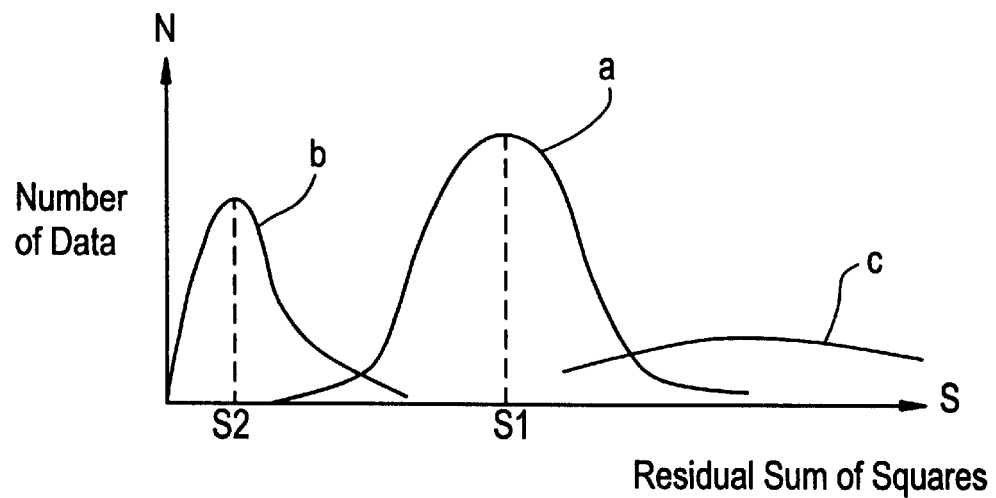
FIG. 6 illustrates the concept of a histogram.

FIG. 6 shows the concept of the histogram of the residual sums of squares S when the image is an absolute-value image. As shown, the histogram consists of three distribution curves a, b and c.

The distribution curve a is a Gaussian distribution curve, resulted from noise in the uniform structure portion. The distribution curve b is a Rayleigh distribution curve, resulted from noise in a portion of an FOV (field of view) which does not contain the object 300, i.e., noise in a background. Because the image is an absolute-value image, the distribution curve resulted from noise in the background does not conform to the Gaussian distribution but to the Rayleigh distribution. The distribution curve c results from the fine structure of the object, and exhibits an indeterminate distribution, unlike the two other curves.

At Step 512, peak position detection is performed for the histogram. Thus, a peak position s1 is detected for the Gaussian distribution curve a, and a peak position s2 is detected for the Rayleigh distribution curve b.

Since the histogram has discrete values in practice, fitting to a function is preferably performed at Step 512 prior to the peak detection, in that the peak positions can be detected with a good accuracy. The functions employed in the fitting are, for example, a Gaussian distribution function and a Rayleigh distribution function, respectively. However, the functions are not limited thereto but may be any appropriate function.

The data processing section 170 for performing the fitting is an embodiment of the fitting means of the present invention. The process of Step 512 is an embodiment of the fitting function of the present invention.

Next, at Step 514, the variance of noise is calculated. The calculation of the variance of noise is performed based on the peak position s1 or s2.

Since s1, s2 and σ have respective relationships:

$$S = k \cdot \sigma^2 \text{ and} \quad (2)$$

$$S_2 = (2 - \frac{\pi}{2}) k \cdot \sigma^2, \quad (3)$$

the value of σ is determined from these relationships. The value of σ is the same whether it is determined from Eq. (2) or from Eq. (3). The determined value of σ is stored in the memory, and is used in filtering the image later.

Under some conditions of the distribution curve c, the peak position s1 of the Gaussian distribution curve a may not accurately be detected. In this case, the value of σ is determined based on the peak position s2 of the Rayleigh distribution curve b. Moreover, with respect to an image having the larger proportion of the background portion area, the Rayleigh distribution curve b is more suitable for determining the variance of noise with a good accuracy.

The data processing section 170 for performing the processes of Steps 512 and 514 is an embodiment of the noise variance calculating means of the present invention. The processes of Steps 512 and 514 constitute an embodiment of the noise variance calculating function of the present invention.

While the preceding description is made on a case of an absolute-value image, when the image to be processed is a positive-negative image, i.e., a real-part image or imaginary-part image, noise in the background portion has positive and negative values centering zero.

Figure 7:
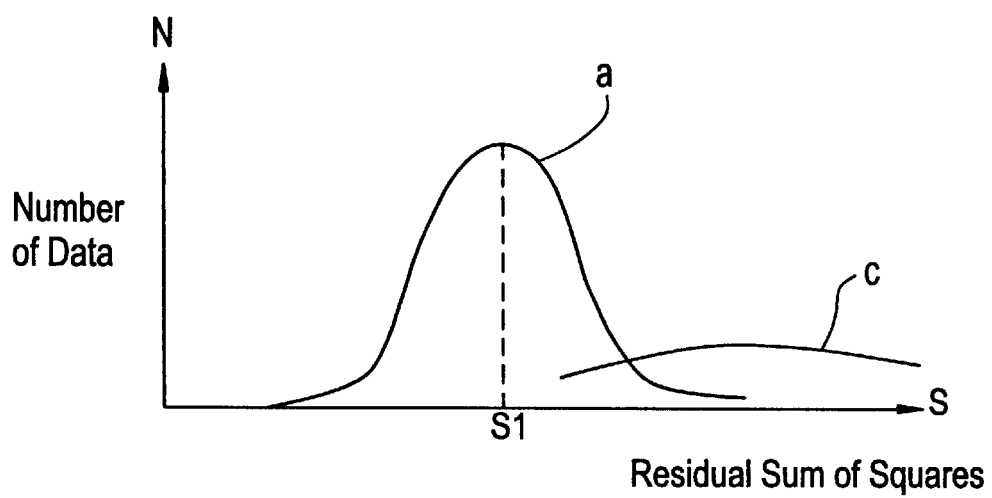
FIG. 7 illustrates the concept of a histogram.

Accordingly, the histogram generated at Step 510 becomes one as exemplarily shown in FIG. 7, and it has no longer the Rayleigh distribution. In this case, the variance of noise is determined based on the peak position s1 of the Gaussian distribution curve a at Step 514.

The variance of noise thus obtained can be employed as a reference of decision for appropriately switching the filtering technique depending on a local structure in the image to be processed.

Specifically, when the variance of pixel values in a local region containing a pixel of interest and the variance of noise have no significant difference, the image probably has no prominent structure in the local region, and the variance of pixel values probably originates from the noise. In this case, the pixel value of the pixel of interest is determined by, for example, low-pass filtering the pixel values in the region.

On the other hand, when the variance of pixel values in a local region containing a pixel of interest and the variance of noise have a significant difference, the image probably has a specific structure, such as an edge, in the local region, and the variance of pixel values probably originates from the structure of the image. In this case, the pixel value of the pixel of interest is determined by, for example, performing filtering in combination with the sharpness preservation process on the pixel values in the region.

Figure 8:
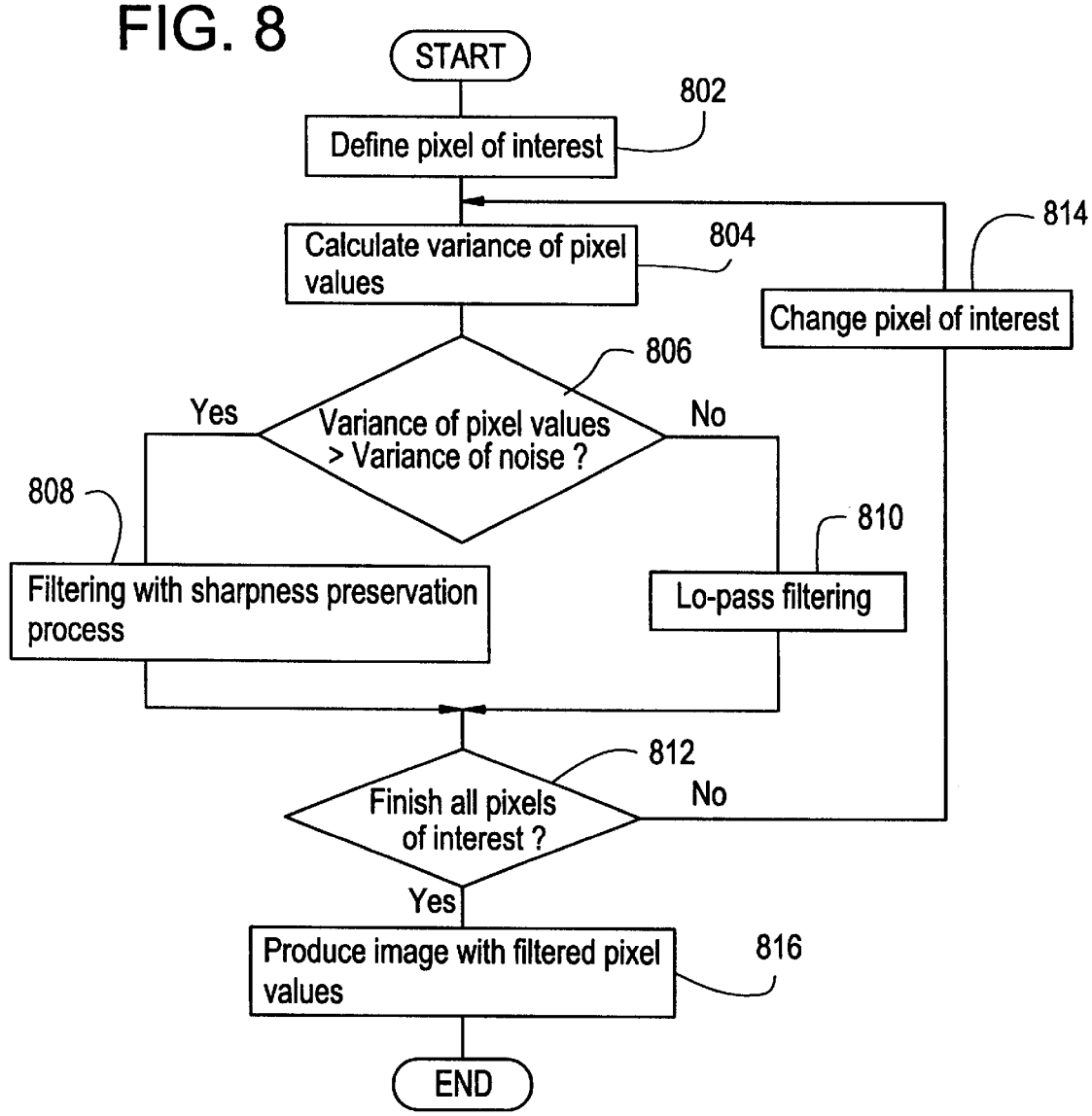
FIG. 8 is a flow chart of image processing performed by the apparatus shown in FIG. 1 or 2

FIG. 8 shows a flow chart of a process involving switching of the filtering with reference to the variance of noise. As shown, at Step 802, a pixel of interest in an image is defined. The first pixel of interest is, for example, a pixel in the center of the image.

Figure 9:
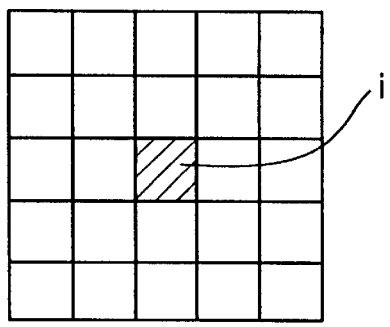
FIG. 9 illustrates the relationship between a pixel of interest and a local region.

Next, at Step 804, the variance of pixel values in a local region containing the pixel of interest is calculated. The local region containing the pixel of interest is, for example, a 5×5 matrix centering the pixel of interest i, as shown in FIG. 9.

Next, at Step 806, a decision is made whether the variance of pixel values is larger than the variance of noise.

If the variance of pixel values is larger than the variance of noise, the filtering in combination with the sharpness preservation process is performed at Step 808, and the result is set to the pixel value of the pixel of interest. If the variance of pixel values is not larger than the variance of noise, the low-pass filtering is performed at Step 810, and the result is set to the pixel value of the pixel of interest.

Next, at Step 812, a decision is made whether the above processes are finished for all the pixels of interest, and if not, the pixel of interest is changed to the adjacent one, for example, at Step 814, and the processes from Step 804 are performed. Thereafter, the same processes are repeated to determine the pixel values of all the pixels of interest. Then, an image is produced using the determined pixel values at Step 816.

A program for a computer to perform the functions as described above is recorded on a recording medium in a computer-readable manner. For the recording medium, for example, any one of a magnetic recording medium, an optical recording medium, a magneto-optical recording medium and any other appropriate type of recording medium is employed. The recording medium may be a semiconductor storage medium. A storage medium is synonymous with a recording medium in the present specification.

The preceding description is made on an example in which the image processing is performed by a data processing section in a magnetic resonance imaging apparatus; however, it will be easily recognized that the image processing may be performed by a data processing apparatus separate from the magnetic resonance imaging apparatus, such as an EWS (engineering workstation) or PC (personal computer).

Moreover, although the imaging apparatus is described as being a magnetic resonance imaging apparatus in the preceding description, the imaging apparatus is not limited thereto but may be any other type of imaging apparatus, such as an X-ray CT (computed tomography) apparatus, an X-ray imaging apparatus, PET (positron emission tomography) or a γ-camera.

Furthermore, while the present invention is described with reference to an example of processing a medical image, the object to be processed is not limited to the medical image, but the present invention can generally be applied to, for example, calculation of the variance of noise for a variety of images, such as a digital image captured by an optical instrument.

Many widely different embodiments of the invention may be configured without departing from the spirit and the scope of the present invention. It should be understood that the present invention is not limited to the specific embodiments described in the specification, except as defined in the appended claims.

What is claimed is:

1. An image processing method comprising the steps of:
   determining a residual sum of squares of pixel values for each of a plurality of local regions defined over an entire image;
   obtaining a histogram of said residual sums of squares; and determining a variance of noise based on the residual sum of squares that gives a peak of said histogram.

2. The image processing method of claim 1, wherein the pixel value in said image is the absolute value of a complex number.

3. The image processing method of claim 1, wherein the pixel value in said image is the real part of a complex number.

4. The image processing method of claim 1, wherein the pixel value in said image is the imaginary part of a complex number.

5. The image processing method of claim 1, wherein said image is one captured by using magnetic resonance.

6. An image processing method comprising the steps of:

determining a residual sum of squares of pixel values for each of a plurality of local regions defined over an entire image;

obtaining a histogram of said residual sums of squares;

fitting said histogram to a function; and determining a variance of noise based on a variable that gives a peak value of said fitted function.

7. The image processing method of claim 6, wherein said function is a Gaussian distribution function.

8. The image processing method of claim 6, wherein said function is a Rayleigh distribution function.

9. The image processing method of claim 6, wherein said function comprises Gaussian and Rayleigh distribution functions.

10. An image processing apparatus comprising:

a residual sum of squares calculating device for determining a residual sum of squares of pixel values for each of a plurality of local regions defined over an entire image;

a histogram calculating device for obtaining a histogram of said residual sums of squares; and a noise variance calculating device for determining a variance of noise based on the residual sum of squares that gives a peak of said histogram.

11. The image processing apparatus of claim 10, wherein the pixel value in said image is the absolute value of a complex number.

12. The image processing apparatus of claim 10, wherein the pixel value in said image is the real part of a complex number.

13. The image processing apparatus of claim 10, wherein the pixel value in said image is the imaginary part of a complex number.

14. The image processing apparatus of claim 10, wherein said image is one captured by using magnetic resonance.

15. An image processing apparatus comprising:

a residual sum of squares calculating device for determining a residual sum of squares of pixel values for each of a plurality of local regions defined over an entire image;

a histogram calculating device for obtaining a histogram of said residual sums of squares;

a fitting device for fitting said histogram to a function; and a noise variance calculating device for determining a variance of noise based on a variable that gives a peak value of said fitted function.

16. The image processing apparatus of claim 15, wherein said function is a Gaussian distribution function.

17. The image processing apparatus of claim 15, wherein said function is a Rayleigh distribution function.

18. The image processing apparatus of claim 15, wherein said function comprises Gaussian and Rayleigh distribution functions.

19. A recording medium which records in a computer-readable manner a program for a computer to perform:

a residual sum of squares calculating function for determining a residual sum of squares of pixel values for each of a plurality of local regions defined over an entire image;

a histogram calculating function for obtaining a histogram of said residual sums of squares; and a noise variance calculating function for determining a variance of noise based on the residual sum of squares that gives a peak of said histogram.

20. A recording medium which the medium records in a computer-readable manner a program for a computer to perform:

a residual sum of squares calculating function for determining a residual sum of squares of pixel values for each of a plurality of local regions defined over an entire image;

a histogram calculating function for obtaining a histogram of said residual sums of squares;

a fitting function for fitting said histogram to a function; and a noise variance calculating function for determining a variance of noise based on a variable that gives a peak value of said fitted function.

21. An imaging apparatus for producing an image based on a signal collected from an object, comprising:

a residual sum of squares calculating device for determining a residual sum of squares of pixel values for each of a plurality of local regions defined over an entire image;

a histogram calculating device for obtaining a histogram of said residual sums of squares; and a noise variance calculating device for determining a variance of noise based on the residual sum of squares that gives a peak of said histogram.

22. An imaging apparatus for producing an image based on a signal collected from an object, comprising:

a residual sum of squares calculating device for determining a residual sum of squares of pixel values for each of a plurality of local regions defined over an entire image;

a histogram calculating device for obtaining a histogram of said residual sums of squares;

a fitting device for fitting said histogram to a function; and a noise variance calculating device for determining a variance of noise based on a variable that gives a peak value of said fitted function.

* * * * *